United States Patent [19]
DeToma

[11] 3,739,654
[45] June 19, 1973

[54] INTERMITTENT GEARING ARRANGEMENT
[75] Inventor: Samuel M. DeToma, Natick, Mass.
[73] Assignee: Eduj Corporation, Boston, Mass.
[22] Filed: Jan. 24, 1972
[21] Appl. No.: 220,174

[52] U.S. Cl............................ 74/461, 74/84, 74/437
[51] Int. Cl. ... F16h 27/04, F16h 55/14, F16h 55/04
[58] Field of Search........................ 74/461, 437, 84

[56] References Cited
UNITED STATES PATENTS
| 3,421,380 | 1/1969 | Mansour | 74/84 |
| 3,442,146 | 5/1969 | Simpson | 74/84 |
| 3,496,791 | 2/1970 | Gabriel | 74/84 X |

Primary Examiner—Leonard H. Gerin
Attorney—Gerald Altman, Richard J. Oates and Herbert L. Bello

[57] ABSTRACT

A pair of cooperating gears provides an intermittent indexing action. One rotary gear member is formed with peripheral spaced indents while another rotary gear member, in mesh with the first member, is provided with a plurality of radially extending resilient arms adapted to engage drivingly the indents of the first member during part of a cycle. The arms disengage the indents during another part of a cycle by bending out of the plane of the gear to ride along smooth lands formed between indents on the first gear.

5 Claims, 7 Drawing Figures

PATENTED JUN 19 1973 3,739,654

INTERMITTENT GEARING ARRANGEMENT

BACKGROUND OF THE INVENTION

1. Field of the Invention

This invention relates generally to gearing arrangements and more particularly is directed towards a new and improved gear system providing an intermittent driving action from one gear to another.

2. Description of the Prior Art

In designing gear drive systems, oftentimes the need arises to provide an intermittent action wherein one gear member may be rotated at a constant speed while a pinion gear output is rotated intermittently. Heretofore, a common technique for achieving this action has been the use of a Geneva gear. While the Geneva gear has long been used for an intermittent drive, it is a relatively complex mechanism, difficult to fabricate and not suitable for low cost, mass production, gear systems.

Accordingly, it is an object of the present invention to provide a new and improved intermittent gear drive of simplified configuration and construction and adapted for low cost mass production.

SUMMARY OF THE INVENTION

This invention features an intermittent gear system comprising first and second rotary members drivingly connected to one another, said first member being of generally circular comfiguration formed with angularly spaced detents and flat lands about the peripheral edge thereof, said second member being formed with a central hub portion and a plurality of radially extending arms each terminating at its outer end in a cam-shaped tooth adapted to drivingly engage an indent on the first gear during a portion of the rotation thereof and to disengage the indent during another portion of rotation. The arms are resilient to permit the ends thereof to deflect out of the plane of the gears to ride against the marginal lands between adjacent indents during a null period.

DETAILED DESCRIPTION OF THE PREFERRED EMBODIMENT

Figures 1, 2, 3, 4, 5, 6, 7:
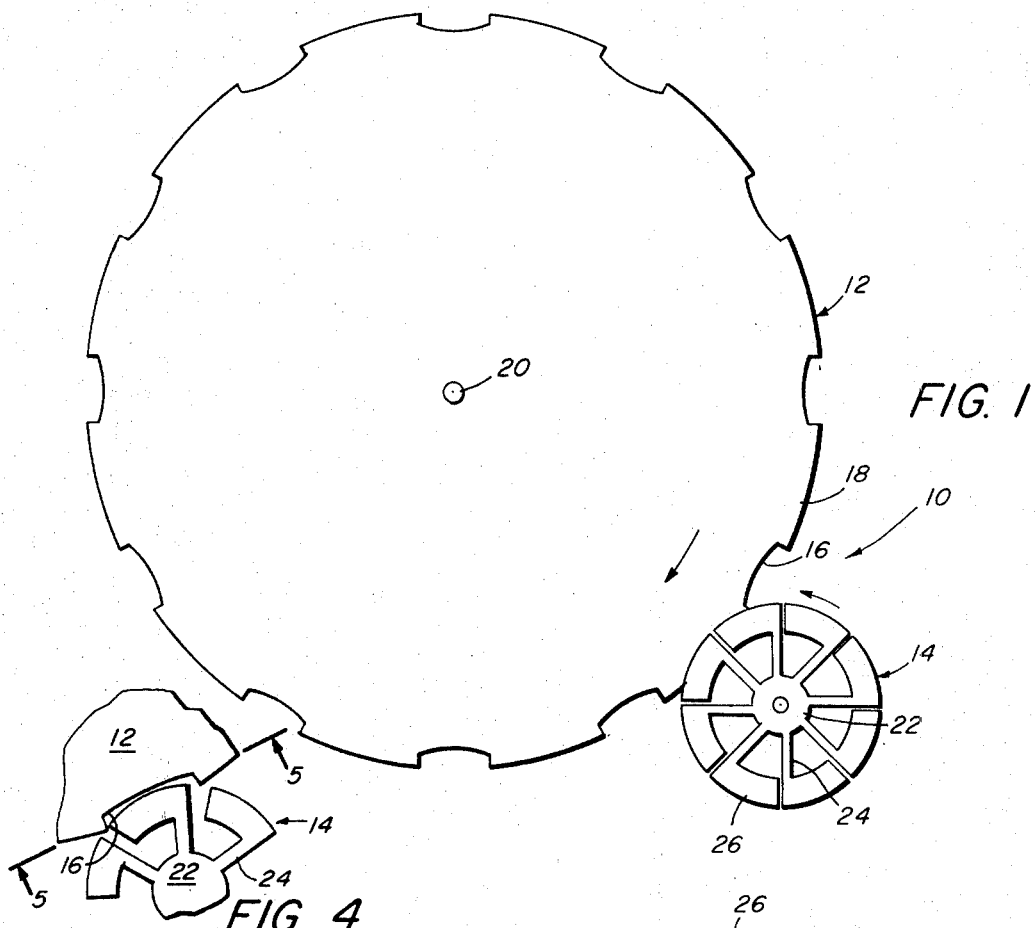
FIG. 1 is a top plan view of an intermittent gear drive system made according to the invention.
FIG. 2 is a side elevation of the pinion gears shown in FIG. 1.
FIG. 3 is a detail sectional view in side elevation, showing a pinion segment in a disengaged position with respect to the main gear of FIG. 1.
FIG. 4 is a detail plan view showing a pinion segment in mesh with the main gear.
FIG. 5 is a cross-sectional view taken along the line 5—5 of FIG. 4.
FIG. 6 is a view similar to FIG. 5 showing a pinion segment partially disengaging the main gear, and, FIG. 7 is a view similar to FIG. 6 showing the pinion segment fully disengaged.

Referring now to the drawings, the reference character 10 generally indicates a gear drive arrangement comprised of a main gear 12 and a pinion gear 14. The main gear 12 is the driving gear and, in the preferred embodiment, is in the form of a generally circular, flat disc formed about its periphery with evenly spaced indents 16 with smooth lands 18 between adjacent indents. The gear 12 rotates about a central axis 20 and may be rotated manually or by a power drive.

The pinion gear 14 is generally circular in outline formed with a central hub 22 having a plurality of radially extending resilient arms 24 evenly spaced about the hub and terminating at their other ends with cam-shaped, arcuate tooth segments 26 adapted intermittently to mesh with a cooperating indent 16 in the main gear 12 and then ride over a land 18 during a non-meshing phase.

As best shown in FIGS. 5, 6 and 7, each tooth segment 26 at the end of each arm 24 is formed with a cam surface 28 on one side thereof extending from a leading end 30 to a trailing end 32 of the segment. A flat rear driving face 34 is formed at the trailing end of the segment and is adapted to drivingly engage a radial face 36 formed in the indent 16 of the main gear 12. An opposing face 38 is formed opposite the face 36 and cooperates with the cam surface 28 of the segment 26 to disengage the main gear from the pinion as will be described.

When the main gear 12 is rotated in the direction of the arrow illustrated in FIG. 1, and indent 16 moves into registration with one of the radial arms and segments 26 on the pinion, whereby the segment 26 of the pinion will drop into the indent. Once the segment is in the indent, a driving connection is made between the main gear in the pinion causing the pinion to rotate through a predetermined arc.

FIG. 4 shows the segment 26 in a driving connection with the main gear and it will be understood that the pinion and main gear normally lie in the same plane. As the main gear rotates, it will first cause the pinion gear to rotate and then, as rotation continues, the main gear gradually disengages the pinion by reason of the indent face 38 engaging the cam face 28 of the segment, as best shown in FIG. 6. This engagement will cause the pinion arm 24 to bias upwardly, out of the indent, until the segment 26 rides up onto the land 18 fully disengaged. In this position, the main gear rotates underneath the segment and the pinion does not rotate. As the main gear continues to rotate, the next adjacent indent moves in under the next radial segment of the pinion, again producing a driving engagement as before. Thus continuous rotation of the main gear causes an intermittent rotation of the pinion gear.

The gear and pinion may be fabricated from a variety of materials such as plastic, metal, or the like and can be fabricated in a simple, inexpensive manner to provide a highly effective, low cost intermittent gear system for a variety of applications.

Having thus described the invention, what I claim and desire to obtain by Letters Patent of the United States is:

1. A gear system adapted to produce an intermittent indexing action, comprising
   a. a first rotary driving gear of generally circular outline formed about its periphery with at least one indent and at least one arcuate and land adjacent said indent, and,
   b. a second rotary gear of generally circular outline formed with a plurality of radially extending resilient arms,
   c. each of said arms being formed with a tooth segment at the outer end thereof adapted to mesh in driving engagement with an indent in said first gear during a part of a rotating cycle of said first gear, d. said segment being formed with a radial face adapted to drivingly engage a cooperating indent face and formed also with a cam surface extending in an axial direction and adapted to engage another indent face and bias said arm and segment out of said indent and onto said land upon rotation of said first gear.

2. A gear according to claim 1 wherein said first gear is formed with a plurality of evenly spaced indents and smooth marginal lands between adjacent indents.

3. A gear according to claim 1 wherein said segments are arcuate.

4. A gear according to claim 1 wherein said first and second gears are co-planar.

5. A gear according to claim 1 wherein said radial face is perpendicular to the plane of said second gear and said cam surface extends from one end of said segment to the other along a marginal face thereof.

* * * * *